United States Patent
Matsuura et al.

(10) Patent No.: US 10,415,578 B2
(45) Date of Patent: Sep. 17, 2019

(54) INFORMATION PROCESSING DEVICE AND MANAGEMENT DEVICE

(71) Applicant: FUJITSU LIMITED, Kawasaki-shi, Kanagawa (JP)

(72) Inventors: Yasumichi Matsuura, Kawasaki (JP); Junichi Sugiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 98 days.

(21) Appl. No.: 15/705,974

(22) Filed: Sep. 15, 2017

(65) Prior Publication Data
US 2018/0003186 A1    Jan. 4, 2018

Related U.S. Application Data

(63) Continuation of application No. PCT/JP2015/059001, filed on Mar. 24, 2015.

(51) Int. Cl.
F04D 27/00    (2006.01)
F04B 49/06    (2006.01)
(Continued)

(52) U.S. Cl.
CPC ........... F04D 27/004 (2013.01); F04B 49/06 (2013.01); F04D 25/0613 (2013.01);
(Continued)

(58) Field of Classification Search
CPC . F24F 2110/30; F24F 7/06; G05B 2219/2614; G05B 15/02
(Continued)

(56) References Cited

U.S. PATENT DOCUMENTS

2007/0109725 A1    5/2007 Lindell et al.
2007/0174020 A1*   7/2007 Lanus ................ G06F 11/3044
                                                    702/182
(Continued)

FOREIGN PATENT DOCUMENTS

JP    11-184566    7/1999
JP    2007-122276  5/2007
(Continued)

OTHER PUBLICATIONS

International Search Report dated Jun. 30, 2015 in corresponding International Patent Application No. PCT/JP2015/059001.

Primary Examiner — Michael J Brown
(74) Attorney, Agent, or Firm — Staas & Halsey LLP

(57) ABSTRACT

Power consumption of a cooling fan of an information processing device is reduced. A processor reduces a speed of the cooling fan provided in the information processing device, and controls the cooling fan at a first speed when there is no problem with the operation of the information processing device, the first speed being obtained by reducing the speed of the cooling fan. An interface transmits first information indicating the first speed to a management device. The processor receives second information indicating a second speed from the management device that associates the first speed with identification information identifying the information processing device and stores therein the first information indicating the first speed and the identification information, and controls the speed of the cooling fan according to the second speed when the second speed is lower than the first speed.

4 Claims, 11 Drawing Sheets

(51) Int. Cl.
  *G06F 1/20*   (2006.01)
  *G05B 15/02*  (2006.01)
  *F04D 25/06*  (2006.01)
  *F24F 7/06*   (2006.01)

(52) U.S. Cl.
  CPC .............. *G05B 15/02* (2013.01); *G06F 1/20* (2013.01); *Y02D 10/16* (2018.01)

(58) Field of Classification Search
  USPC .................................................. 700/275, 276
  See application file for complete search history.

(56) References Cited

U.S. PATENT DOCUMENTS

| | | |
|---|---|---|
| 2013/0042639 A1 | 2/2013 | Kobayashi et al. |
| 2013/0144457 A1* | 6/2013 | Cong ..................... G06F 1/206 700/299 |
| 2013/0332757 A1 | 12/2013 | Moss et al. |
| 2014/0092549 A1 | 4/2014 | Kodama |
| 2014/0117908 A1 | 5/2014 | Busch et al. |
| 2014/0281614 A1* | 9/2014 | Mick ................. G05D 23/1917 713/322 |

FOREIGN PATENT DOCUMENTS

| | | |
|---|---|---|
| JP | 2007-149082 | 6/2007 |
| JP | 2009-231493 | 10/2009 |
| JP | 2013-40715 | 2/2013 |
| JP | 2014-72411 | 4/2014 |

* cited by examiner

| CONFIGURATION INFORMATION | INTAKEN-AIR TEMPERATURE | CPU TEMPERATURE | MEMORY TEMPERATURE | FAN SPEED | |
|---|---|---|---|---|---|
| C1 | $T_{A1}$ | $T_{B1}$ | $T_{C1}$ | 80 | |
| C1 | $T_{A1}$ | $T_{B1}$ | $T_{C1}$ | 75 | 301 |
| C1 | $T_{A1}$ | $T_{B1}$ | $T_{C1}$ | 70 | |
| C1 | $T_{A2}$ | $T_{B2}$ | $T_{C2}$ | 68 | |
| C1 | $T_{A2}$ | $T_{B2}$ | $T_{C2}$ | 55 | 302 |
| C1 | $T_{A2}$ | $T_{B2}$ | $T_{C2}$ | 48 | |
| ... | ... | ... | ... | ... | |
| C2 | $T_{A3}$ | $T_{B3}$ | $T_{C3}$ | 60 | |
| C2 | $T_{A3}$ | $T_{B3}$ | $T_{C3}$ | 58 | 303 |
| C2 | $T_{A3}$ | $T_{B3}$ | $T_{C3}$ | 56 | |
| ... | ... | ... | ... | ... | |

F I G. 3

| INTAKEN-AIR TEMPERATURE | CPU TEMPERATURE | MEMORY TEMPERATURE | FAN SPEED | |
|---|---|---|---|---|
| | | | INITIAL VALUE | UPDATED VALUE |
| $T_{A1}$ | $T_{B1}$ | $T_{C1}$ | 20 | 18 |
| $T_{A1}$ | $T_{B2}$ | $T_{C2}$ | 25 | 20 |
| $T_{A1}$ | $T_{B3}$ | $T_{C3}$ | 30 | 28 |
| ... | ... | ... | ... | ... |
| $T_{A2}$ | $T_{B1}$ | $T_{C1}$ | 30 | 29 |
| $T_{A2}$ | $T_{B2}$ | $T_{C2}$ | 35 | 33 |
| $T_{A2}$ | $T_{B3}$ | $T_{C3}$ | 40 | 38 |
| ... | ... | ... | ... | ... |
| $T_{A3}$ | $T_{B3}$ | $T_{C3}$ | 90 | 85 |

F I G. 4

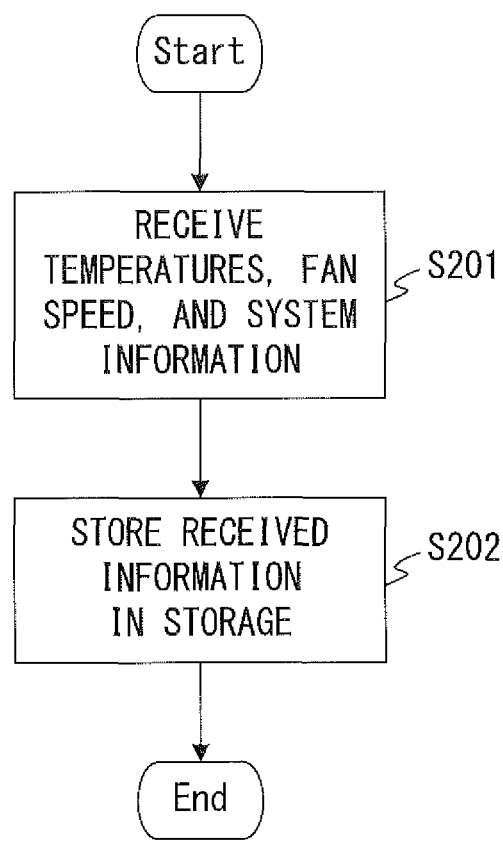
F I G. 7

INFORMATION PROCESSING DEVICE AND MANAGEMENT DEVICE

CROSS-REFERENCE TO RELATED APPLICATION

This application is a continuation application of International Application PCT/JP 2015/059001 filed on Mar. 24, 2015 and designated the U.S., the entire contents of which are incorporated herein by reference.

FIELD

The embodiments discussed herein are related to a control of a speed of a fan provided in an information processing device.

BACKGROUND

A data center is equipment that includes, for example, a high-speed communication line, a power generator, and an air conditioner and that can perform a central control of a plurality of information processing devices. Most of the power consumption in a data center is that of an air conditioner and an information processing device. Further, the power consumption of a large scale integration (LSI) and a cooling fan represents a large percentage of the power consumption of an information processing device.

An information processing device is known that controls a speed of a cooling fan in the information processing device on the basis of a temperature in the information processing device. However, a hardware configuration and a facility environment of an information processing device are not considered in an algorithm that controls a cooling fan speed on the basis of a temperature of the information processing device. Thus, a cooling fan speed that is higher than a cooling fan speed suitable for a hardware configuration and a facility environment of an information processing device may be set in the information processing device which is provided with the algorithm.

A technology is known that calculates an amount of power consumed by a heat generating component in an information processing device and sets a cooling fan speed that corresponds to the calculated amount of consumed power (see, for example, Patent Document 1).

A technology is known that controls an internal server cooling fan and a general fan in a container-type data center on the basis of a CPU temperature (see, for example, Patent Document 2).

As a technology for reducing power consumption in a data center, a technology is known that controls an air conditioner on the basis of a pressure difference between a pressure of a cold aisle and a pressure of a hot aisle in a data center (see, for example, Patent Document 3).

Patent Document 1: Japanese Laid-open Patent Publication No. 2009-231493
Patent Document 2: Japanese Laid-open Patent Publication No. 2014-072411
Patent Document 3: Japanese Laid-open Patent Publication No. 2013-040715

SUMMARY

A processor according to an aspect of the present invention reduces a speed of a cooling fan provided in the information processing device, and controls the cooling fan at a first speed when there is no problem with the operation of the information processing device, the first speed being obtained by reducing the speed of the cooling fan. An interface transmits first information indicating the first speed to a management device. The processor receives second information indicating a second speed from the management device that associates the first speed with identification information identifying the information processing device and stores therein the first information indicating the first speed and the identification information, and controls the speed of the cooling fan according to the second speed when the second speed is lower than the first speed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of information stored in a storage of the management device;
FIG. 4 illustrates an example of a control table;
FIG. 7 is a flowchart that illustrates an example of processing performed by the management device (part 1)

DESCRIPTION OF EMBODIMENTS

The embodiments will now be described in detail with reference to the drawings.

Figure 1:
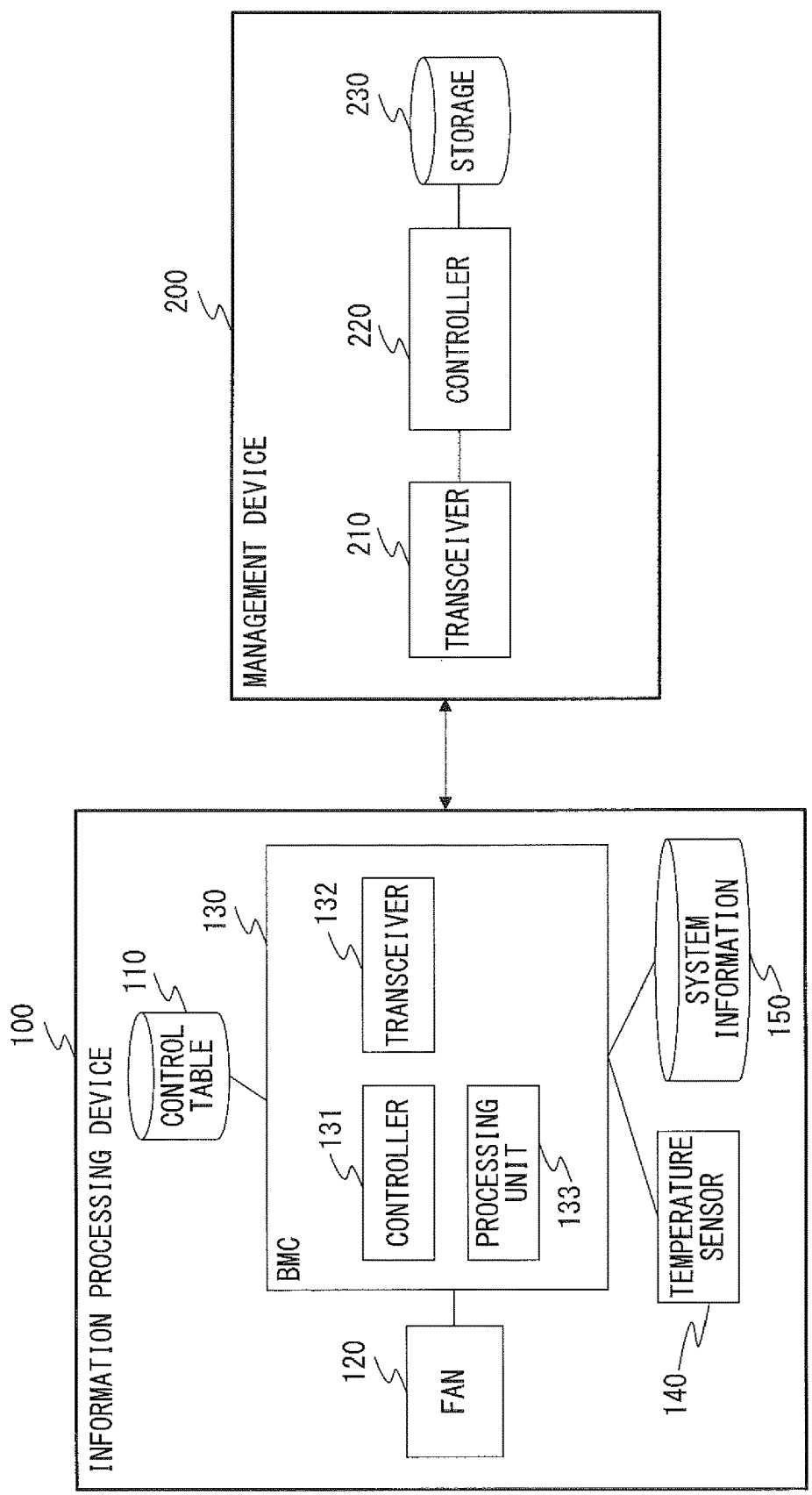
FIG. 1 illustrates an example of an information processing device and a management device according to the present embodiment.

FIG. 1 illustrates an example of an information processing device and a management device according to the present embodiment. An information processing device 100 includes a control table 110, a fan 120, a baseboard management controller (BMC) 130, a temperature sensor 140, and system information 150. The control table 110 includes information indicating a speed of the fan 120 that corresponds to a combination of temperature information (such as an intaken-air temperature, a central processing unit (CPU) temperature, and a memory temperature). The combination of, for example, the intaken-air temperature, the central processing unit (CPU) temperature, and the memory temperature is hereinafter referred to as a "temperature environment". The control table 110 is information that is used when the BMC 130 controls the fan 120. The fan 120 is a cooling fan and is used to cool air in the information processing device 100 and various devices provided in the information processing device 100. The BMC 130 controls a speed of the fan 120 on the basis of, for example, the temperature environment in the information processing device 100, and the control table 110. The BMC 130 includes a controller 131, a transceiver 132, and a processing unit 133. The controller 131 controls the speed of the fan 120. The transceiver 132 is an interface that is used to communicate with a management device 200. The processing unit 133 processes data used in the BMC 130. The temperature sensor 140 is a sensor that measures various types of temperatures such as the intaken-air temperature, the CPU temperature, and the memory temperature (the temperature environment). The system information 150 includes information on, for example, types and the number of devices such as a CPU, a memory, a chip, and a hard disk drive (HDD) that are actually provided in the information processing device 100.

The management device 200 includes a transceiver 210, a controller 220, and a storage 230. The transceiver 210 transmits/receives information to/from the information processing device 100. The controller 220 analyzes information received from the information processing device 100. The storage 230 stores information such as a type of information processing device 100, the temperature environment, and the fan speed.

An example of processing of storing, in the management device 200, information on the fan 120 that is transmitted from the information processing device 100 is sequentially described below.

(A1) The controller 131 in the BMC 130 acquires temperature information (a temperature environment) in the information processing device 100 from the temperature sensor 140 at regular intervals, and controls the fan 120 on the basis of information in the control table 110 and the acquired temperature environment.

(A2) The controller 131 decreases a speed of the fan 120 at a constant rate (for example, by 1% every minute) at regular intervals.

(A3) The controller 131 waits during a certain time period after the speed of the fan 120 is decreased, and determines whether each temperature measured by the temperature sensor 140 is greater than a predetermined threshold. Different thresholds are set for the temperatures to be measured such as an intaken-air temperature, a CPU temperature, and a memory temperature.

(A3.1) When there exists at least one temperature, in the temperatures measured by the temperature sensor 140, that is greater than its predetermined threshold, it is determined that the temperature is beyond an acceptable temperature for the operation of the information processing device 100. Thus, the controller 131 increases the speed of the fan 120 at a constant rate. The processing of increasing the speed of the fan 120 is performed until the temperature in the information processing device 100 falls below its predetermined threshold.

(A3.2) When the temperatures measured by the temperature sensor 140 are not greater than their predetermined thresholds, the controller 131 reports information on the temperatures and the speed of the fan 120 to the processing unit 133. The decreased speed of the fan 120 is hereinafter referred to as a speed after change. Further, the temperatures after the speed of the fan 120 is decreased are hereinafter referred to as temperatures after change.

(A4) The processing unit 133 compares a speed after change with a speed of the fan 120 that is associated with temperatures after change in the control table 110. When the speed after change is lower than the speed of the fan 120 in the control table 110, the processing unit 133 sets the speed after change to be the speed of the fan 120 that is associated with the temperatures after change in the control table 110. The controller 131 reads the control table 110 at regular intervals in the process of (A1), and controls the fan 120 using the speed after change.

(A5) In parallel with the process of (A4), the transceiver 132 transmits information on the system information 150, the temperatures after change, and the speed after change to the management device 200.

(A6) The transceiver 210 in the management device 200 receives the information on the system information 150, the temperatures after change, and the speed after change from the side of the information processing device 100.

(A7) The controller 220 associates the system information 150, the temperatures after change, and the speed after change with one another, and stores them in the storage 230.

As described above, the information processing device 100 decreases a speed of the fan 120 at regular intervals so as to acquire a speed after change that is acceptable for the operation of the information processing device 100. The management device 200 associates the speed after change with the system information 150 and a temperature environment, and stores them.

The speed after change is associated with a plurality of environmental conditions such as an intaken-air temperature, a CPU temperature, a memory temperature, and the system information 150 (such as the number of CPUs and the number of boards), and they are stored in the management device 200. Information on a speed of the fan 120 that corresponds to the plurality of environmental conditions is accumulated in the management device 200 by performing the processes of (A1) to (A7) repeatedly.

Next, processing of the information processing device 100 controlling the fan 120 on the basis of the information accumulated in the management device 200 is described sequentially.

(B1) The transceiver 132 of the information processing device 100 transmits, at regular intervals, the system information 150 and a request to acquire a speed of the fan 120 that corresponds to a temperature environment.

(B2) The transceiver 210 of the management device 200 receives the system information 150 and the acquisition request.

(B3) The controller 220 reads, from the storage 230, a speed of the fan 120 that corresponds to each temperature environment of an information processing device having the same configuration as the system information 150. Here, the controller 220 reads a speed of the fan 120 for each temperature environment that is lowest in the information stored in the storage 230.

(B4) The transceiver 210 transmits the information read by performing the process of (B3) to the side of the information processing device 100.

(B5) The transceiver 132 receives information on a speed of the fan 120 that corresponds to each temperature environment.

(B6) The processing unit 133 compares, for each temperature environment, the received speed with a speed of the fan 120 that is set corresponding to each temperature environment in the control table 110. When the received speed is lower, the processing unit 133 sets the lower speed in the control table 110 as the speed corresponding to the temperature environment.

The control table 110 updated in the process of (B6) is read by the controller 131 at regular intervals. The controller 131 controls a speed of the fan 120 on the basis of the control table 110 and temperatures (a temperature environment) measured by the temperature sensor 140. It is possible to reduce power consumption of the fan 120 of the information processing device 100 by making a speed that corresponds to a temperature environment in the control table 110 lower than, for example, an initial value set in the control table 110.

Figure 2:
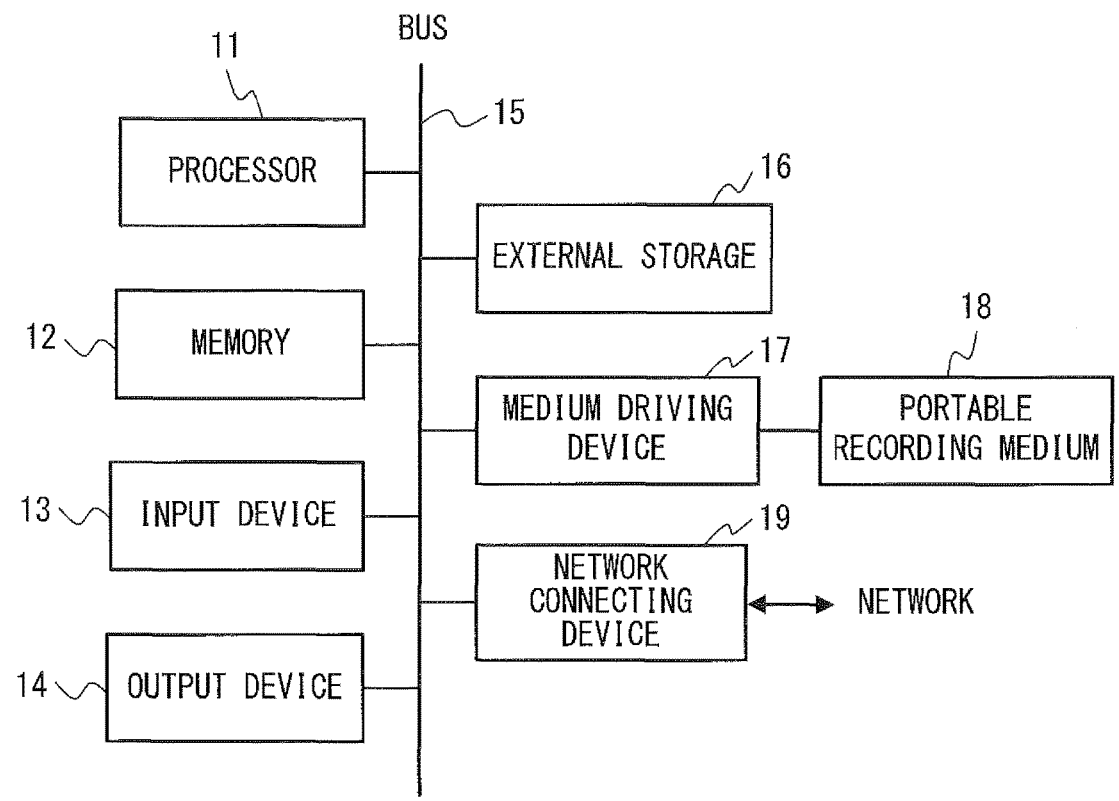
FIG. 2 illustrates an example of a hardware configuration of the information processing device and the management device.

FIG. 2 illustrates an example of a hardware configuration of the information processing device and the management device. The information processing device 100 and the management device 200 each include a processor 11, a memory 12, a bus 15, an external storage 16, and a network connecting device 19. As an option, the information processing device 100 and the management device 200 may each further include an input device 13, an output device 14, and a medium driving device 17. The information processing device 100 and the management device 200 may each be implemented by, for example, a computer.

The processor 11 may be any processing route that includes a central processing unit (CPU). The processor 11 operates as the controller 131 and the processing unit 133 in the information processing device 100. The processor 11 operates as the controller 220 in the management device 200. For example, the processor 11 may execute a program stored in the external storage 16. The memory 12 stores the control table 110 and the system information 150 of the information processing device 100. The memory 12 operates as the storage 230 of the management device 200 and holds information, such as the system information 150, temperatures, and a speed of the fan 120, that is transmitted from the side of the information processing device 100. Further, the memory 12 stores, for example, data acquired by the operation of the processor 11 and data used for processing performed by the processor 11 as needed. The network connecting device 19 is used to communicate with another device and operates as the transceiver 132 and the transceiver 210.

The input device 13 is implemented as, for example, a button, a keyboard, or a mouse, and the output device 14 is implemented as, for example, a display. The output device 14 may be omitted. The bus 15 connects the processor 11, the memory 12, the input device 13, the output device 14, the external storage 16, the medium driving device 17, and the network connecting device 19 such that data passing can be mutually performed between these components. The external storage 16 stores, for example, a program or data and provides stored information to, for example, the processor 11 as needed. The medium driving device 17 can output data in the memory 12 or the external storage 16 to a portable recording medium 18, and read, for example, a program or data from the portable recording medium 18. In this case, the portable recording medium 18 may be any portable recording medium that includes a floppy disk, a magneto-optical (MO) disk, a compact disk recordable (CD-R), and a digital versatile disk recordable (DVD-R).

FIG. 3 illustrates an example of information stored in the storage of the management device. Information received from the information processing device 100 is stored in the storage 230 as a database. The database includes categories of configuration information, an intaken-air temperature, a CPU temperature, a memory temperature, and a fan speed (a duty cycle).

The configuration information is information that indicates a type of the system information 150 included in the information processing device 100. In the example of FIG. 3, the configuration information is represented by, for example, C1 or C2 that indicates system information of an information processing device. For example, C1 represented as configuration information is an example of an information processing device that has a "product name XX" and includes "two CPUs of 3.0 GHz", "eight memories of 32 GB", a "RAID card", and "four HDDs". C2 represented as configuration information is an example of an information processing device that has a "product name YY" and includes a "CPU of 2.8 GHz", "four memories of 4 GB", "two LAN cards", and "two HDDs". It is sufficient if the configuration information is information that indicates a combination of devices provided in an information processing device. The configuration information may be identification information that identifies an information processing device.

The intaken-air temperature is a temperature of air that is intaken by the information processing device 100 from the outside of the information processing device. The CPU temperature is a temperature of a CPU provided in the information processing device 100. The memory temperature is a temperature of a memory provided in the information processing device 100.

The fan speed is represented by, for example, a duty cycle and associated with a combination of configuration information, an intaken-air temperature, a CPU temperature, and a memory temperature. In the example of FIG. 3, three pieces of data that are duty cycles of 80%, 75%, and 70% are stored as a fan speed that corresponds to the case of the configuration information C1, the intaken-air temperature $T_{A1}$, the CPU temperature $T_{B1}$, and the memory temperature $T_{C1}$. In the example of FIG. 3, three pieces of data that are duty cycles of 68%, 55%, and 48% are stored as a fan speed that corresponds to the case of the configuration information C1, the intaken-air temperature $T_{A2}$, the CPU temperature $T_{B2}$, and the memory temperature $T_{C2}$. In the example of FIG. 3, three pieces of data that are duty cycles of 60%, 58%, and 56% are stored as a fan speed that corresponds to the case of the configuration information C2, the intaken-air temperature $T_{A3}$, the CPU temperature $T_{B3}$, and the memory temperature $T_{C3}$. The configuration information, the environmental information, and the fan speed information are information transmitted from the information processing device 100 to the management device 200 in the process of (A5).

The controller 220 of the management device 200 receives the system information 150 and a request to acquire a speed of the fan 120 from the information processing device 100 at regular intervals (the process of (B2)). For example, the system information 150 is information that indicates the configuration information C1. The controller 220 of the management device 200 reads a speed of the fan 120 that corresponds to a temperature environment of an information processing device having the same configuration as the system information 150, and that is lowest in the information stored in the storage 230 illustrated in FIG. 3. In other words, when the information processing device 100 is the configuration information C1, the controller 220 of the management device 200 reads the fan speed 70% (duty cycle) of a case 301 in which the speed of the fan 120 is lowest in the case of "intaken-air temperature $T_{A1}$, CPU temperature $T_{B1}$, memory temperature $T_{C1}$". The controller 220 of the management device 200 further reads the fan speed 48% (duty cycle) of a case 302 in which the speed of the fan 120 which corresponds to a combination of "intaken-air temperature $T_{A2}$, CPU temperature $T_{B2}$, memory temperature $T_{C2}$" is lowest. There exist two temperature environments ("intaken-air temperature $T_{A1}$, CPU temperature $T_{B1}$, memory temperature $T_{C1}$" and "intaken-air temperature $T_{A2}$, CPU temperature $T_{B2}$, memory temperature $T_{C2}$") for the configuration information C1, so a case in which the speed of the fan 120 is lowest is read for each of the two temperature environments. Further, when settings for a plurality of temperature environments are stored in the storage of the management device 200, a case in which the speed of the fan 120 is lowest is read for each of the plurality of temperature environments. The transceiver 210 of the management device 200 transmits the read information to the side of the information processing device 100.

As described above, the information processing device 100 can acquire a lowest speed of the fan 120 for each temperature environment for each type of information processing device (configuration information) from the management device 200. The information processing device 100 stores information on the acquired temperature environment and the acquired speed as the control table 110. The controller 131 of the information processing device 100 controls a speed of the fan 120 on the basis of the control table 110 and temperatures measured by the temperature sensor 140. The speed of the fan 120 that corresponds to each temperature environment is less than an initial value, so it is possible to reduce power consumption of the fan 120.

FIG. 4 illustrates an example of the control table. For example, the control table 110 includes a category of a temperature environment such as an intaken-air temperature, a CPU temperature, and a memory temperature, and a category of a fan speed (duty cycle). The controller 131 of the information processing device 100 controls a speed of the fan 120 on the basis of the control table 110 and a temperature environment measured by the temperature sensor 140. An initial value of the fan speed (duty cycle) is a value that is set in the control table 110 of the information processing device 100 in advance. An updated value is a value after updating performed on the basis of a fan speed received from the management device 200.

For example, when "intaken-air temperature $T_{A2}$, CPU temperature $T_{B2}$, memory temperature $T_{C2}$" is measured by the temperature sensor 140, the controller 131 sets 38% to be a speed of the fan 120 (duty cycle). The value set as the initial value is not used when the updated value is set.

Figure 5:
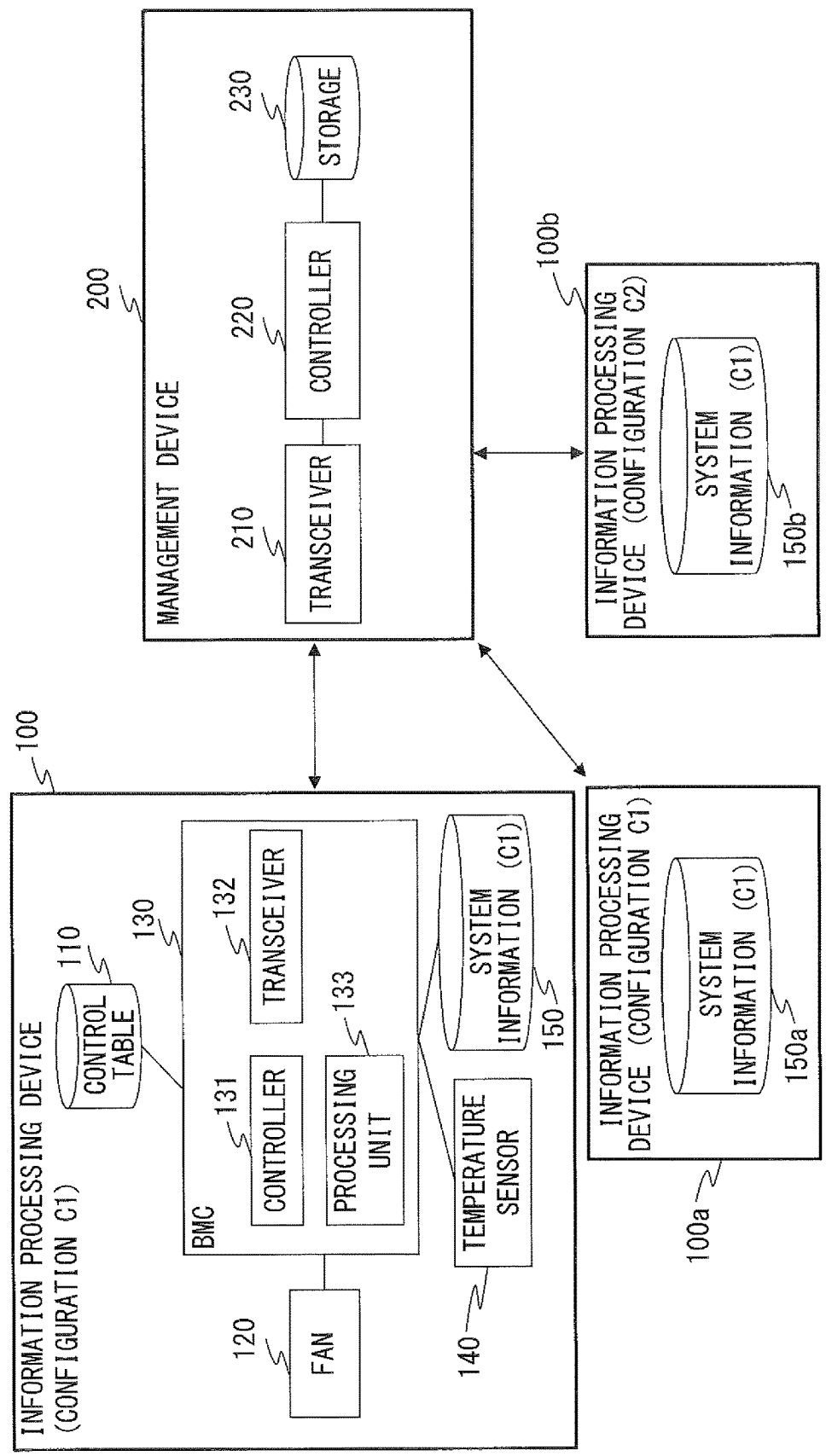
FIG. 5 illustrates an example of a system that includes a plurality of information processing devices and the management device.

FIG. 5 illustrates an example of a system that includes a plurality of information processing devices and the management device. For the same components as those in FIG. 1, like reference numbers are used in FIG. 5 to describe the information processing device 100 and the management device 200 of FIG. 5. In FIG. 5, an information processing device 100a and an information processing device 100b are connected to the management device 200. The information processing device 100a and the information processing device 100b each include the same hardware configuration as that of the information processing device 100. Further, the information processing device 100a and the information processing device 100b each include the control table 110 (not illustrated), the fan 120 (not illustrated), the BMC 130 (not illustrated), the temperature sensor 140 (not illustrated), and the system information 150. Furthermore, the information processing device 100a and the information processing device 100b each perform the processes of (A1) to (A7) and the processes of (B1) to (B6) together with the management device 200.

When a plurality of information processing devices are used as a system, information processing devices of the same type may be introduced. In the example of FIG. 5, the information processing device 100 and the information processing device 100a are an information processing device of the configuration information C1. Further, information processing devices of different types may be introduced for the same system. The information processing device 100b is an information processing device of the configuration information C2.

When the information processing device 100 and the information processing device 100a perform the processes of (A1) to (A7), the management device 200 stores information on a temperature environment of the configuration information C1 and a speed of the fan 120 that corresponds to the temperature environment. Thus, the information on the speed of the fan 120 can be shared between the information processing devices having the same configuration that is the configuration information C1.

In other words, in the information processing device 100, a speed of the fan 120 is decreased at a constant rate (for example, by 1% every minute) and the speed of the fan 120 is reported to the management device 200. The management device 200 stores the speed of the fan 120. In the process of (B1), the information processing device 100a makes a request to acquire information on a fan speed of the configuration information C1 at regular intervals. The controller 220 of the management device 200 reads, for each temperature environment, a (lowest) fan speed of the configuration information C1 that is included in the acquisition request. The transceiver 210 of the management device 200 transmits the (lowest) fan speed for each temperature environment to the information processing device 100a. As described above, when the configuration information of the information processing device 100 and the configuration information of the information processing device 100a are the same, it is possible to share a speed of fan 120 that corresponds to a temperature environment.

The configuration information of the information processing device 100b is the configuration information C2, so it is not the same as that of the information processing device 100 and the information processing device 100a. Thus, a speed of the fan 120 that corresponds to a temperature environment is not shared between the information processing device 100b and the information processing device 100 or between the information processing device 100b and the information processing device 100a.

Figure 6:
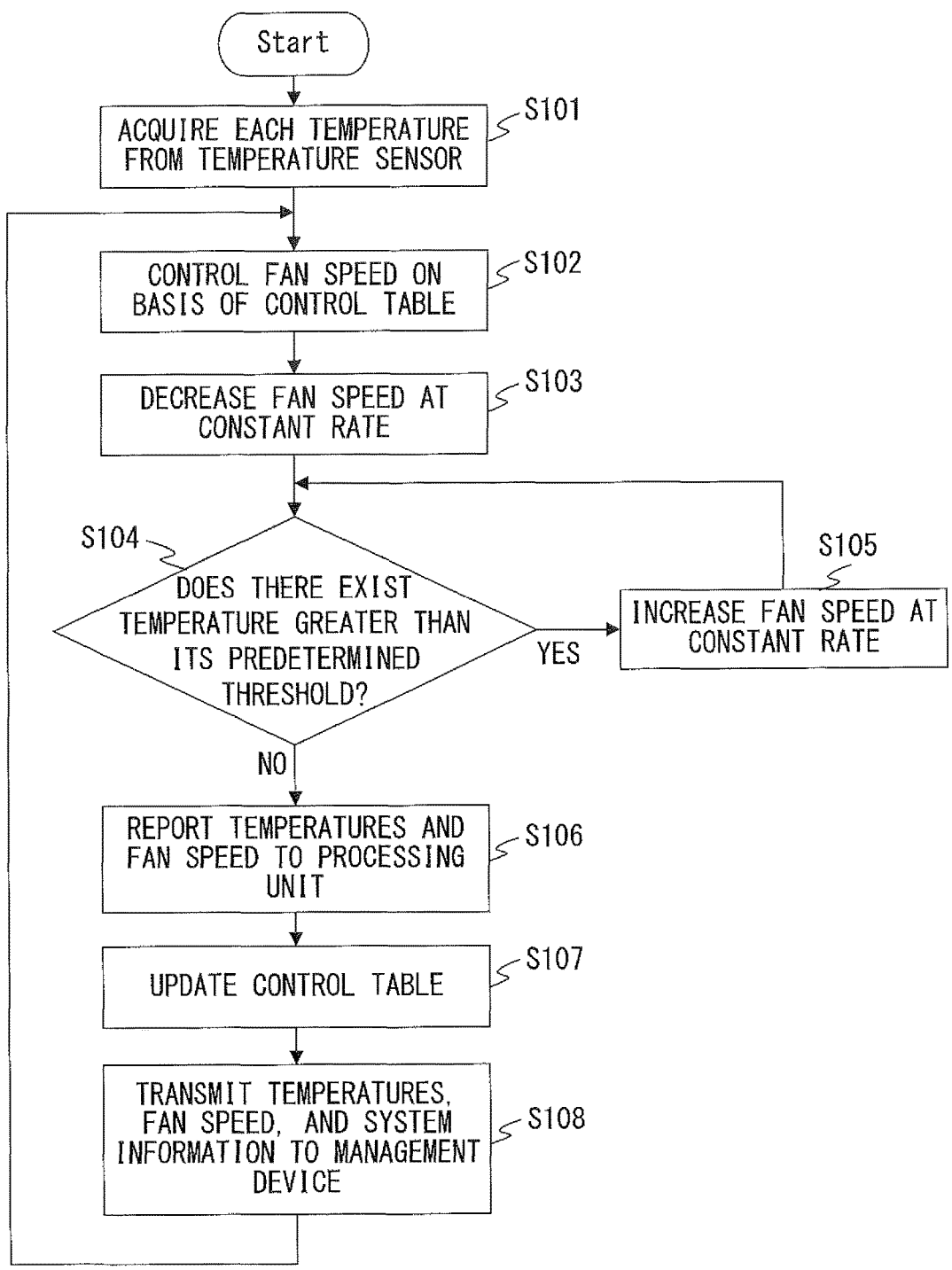
FIG. 6 is a flowchart that illustrates an example of processing performed by the information processing device (part 1)

FIG. 6 is a flowchart that illustrates an example of processing performed by the information processing device (part 1). The processing of FIG. 6 is a flowchart of the processes of (A1) to (A5) described with reference to FIG. 1. The controller 131 acquires temperature information (a temperature environment) in the information processing device 100 from the temperature sensor 140 (Step S101). The controller 131 controls the fan 120 on the basis of information in the control table 110 and the acquired temperature environment (Step S102). The controller 131 decreases a speed of the fan 120 at a constant rate (for example, by 1% every minute) (Step S103). The controller 131 waits during a certain time period after the speed of the fan 120 is decreased, and determines whether each temperature measured by the temperature sensor 140 is greater than a respective predetermined threshold (Step S104). When there exists a temperature, in the temperatures measured by the temperature sensor 140, that is greater than its predetermined threshold (YES in Step S104), the controller 131 increases the speed of the fan 120 at a constant rate (Step S105). When the temperatures measured by the temperature sensor 140 are not greater than their predetermined thresholds (NO in Step S104), the controller 131 reports information on the temperatures and the speed of the fan 120 to the processing unit 133 (Step S106). The processing unit 133 sets a speed after change to be a speed of the fan 120 that is associated with temperatures after change in the control table 110 (Step S107). The transceiver 132 transmits information on the system information 150, the temperatures after change, and the speed after change to the management device 200 (Step S108). When the process of Step S108 is terminated, the controller 131 repeats the processes of and after Step S102. The process of Step S108 may be performed prior to Step S107, or it may be performed in parallel with Step S107.

Accordingly, the information processing device 100 decreases a fan speed at a constant rate at regular intervals so as to set a fan speed that corresponds to a temperature environment, which results in being able to reduce power consumption of the fan.

FIG. 7 is a flowchart that illustrates an example of processing performed by the management device (part 1). The processing of FIG. 7 is a flowchart of the processes of (A6) and (A7) described with reference to FIG. 1. The transceiver 210 receives the information on the system information 150, the temperatures after change, and the speed after change from the side of the information processing device 100 (Step S201). The controller 220 associates the received system information 150, the received temperatures after change, and the received speed after change with one another, and stores them in the storage 230 (Step S202).

In the processes of Step S201 and Step S202, the management device 200 stores information received from the information processing device 100, the information processing device 100a, and the information processing device 100b in the storage. This results in being able to collect much fan-speed information that corresponds to configuration information and a temperature environment of an information processing device.

Figure 8:
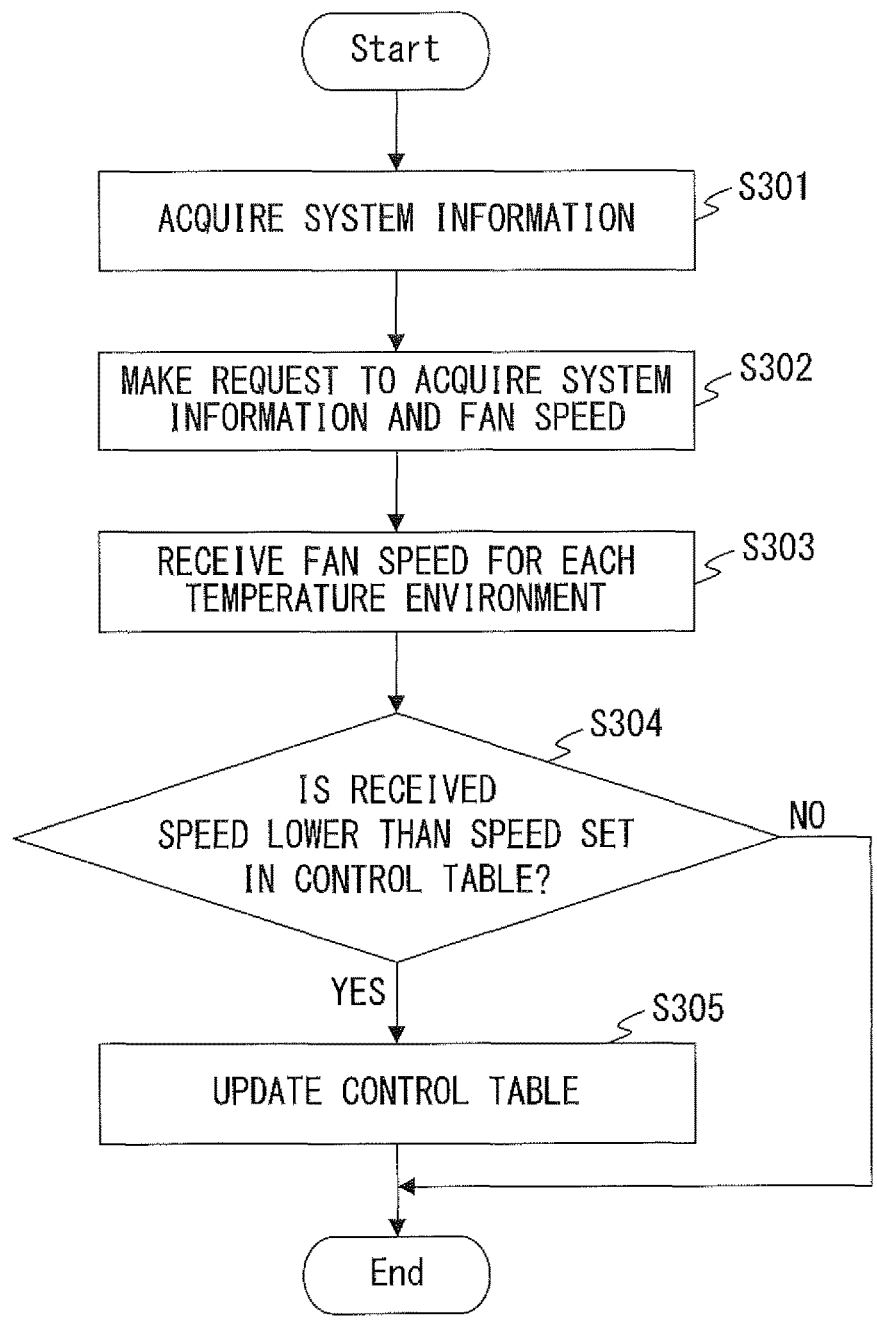
FIG. 8 is a flowchart that illustrates an example of processing performed by the information processing device (part 2)

FIG. 8 is a flowchart that illustrates an example of processing performed by the information processing device (part 2). The information processing device 100 may perform the processes of (B1) to (B6) described with reference to FIG. 1 when the information processing device 100 is powered on.

The processing unit 133 acquires the system information 150 (Step S301). The transceiver 132 transmits the system information 150 and a request to acquire a speed of the fan 120 that corresponds to a temperature environment (Step S302). The transceiver 132 receives information on a speed of the fan 120 that corresponds to each temperature environment from the management device 200 (Step S303). The processing unit 133 determines whether the received speed is lower than a speed of the fan 120 that is set corresponding to each temperature environment in the control table 110 (Step S304). When the received speed is lower (YES in Step S304), the processing unit 133 sets the lower speed in the control table 110 as the speed corresponding to the temperature environment (Step S305). When the received speed is higher (NO in Step S304), the processing unit 133 terminates the processing. Alternatively, when the process of Step S305 is terminated, the processing unit 133 terminates the processing.

Figure 9:
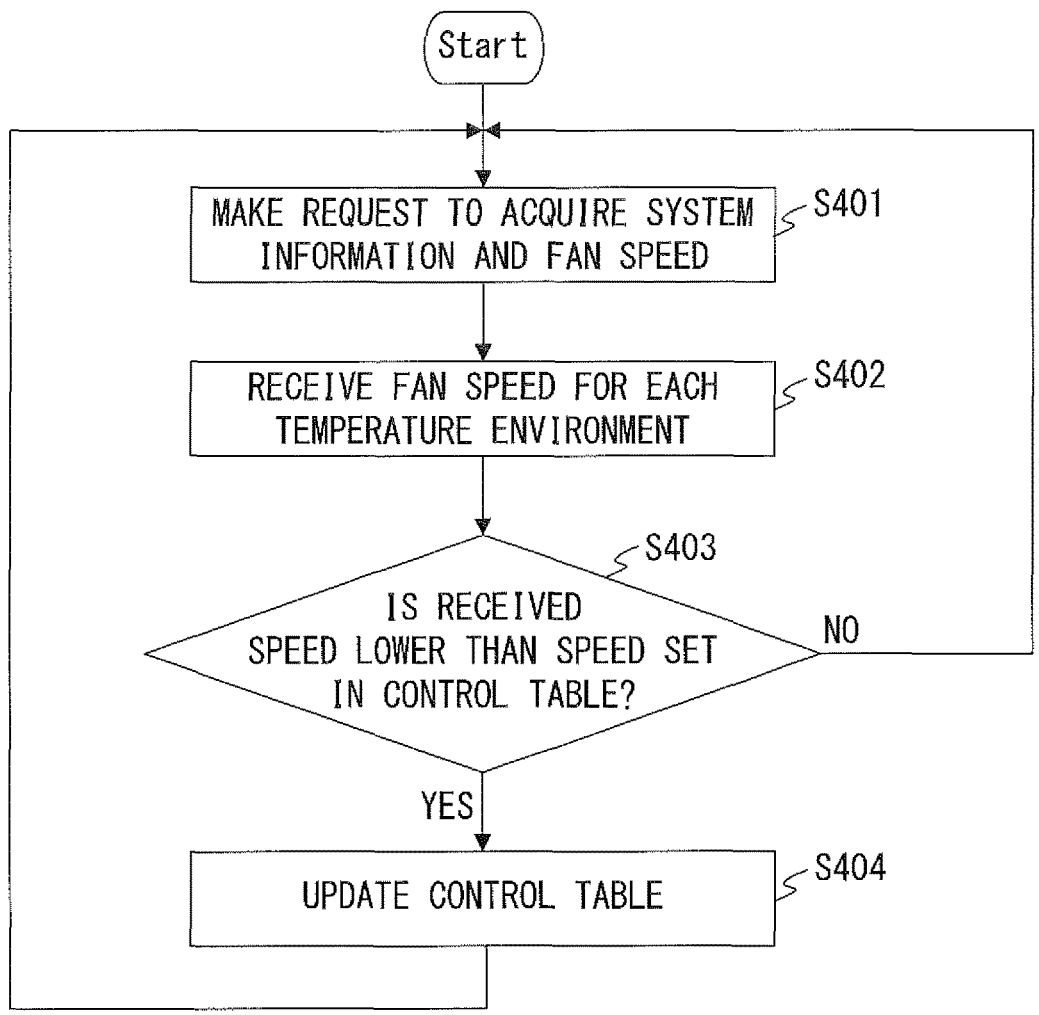
FIG. 9 is a flowchart that illustrates an example of processing performed by the information processing device (part 3)

FIG. 9 is a flowchart that illustrates an example of processing performed by the information processing device (part 3). The information processing device 100 may perform the processes of (B1) to (B6) described with reference to FIG. 1 after the processing of FIG. 8 is terminated. The transceiver 132 transmits the system information 150 and a request to acquire a speed of the fan 120 that corresponds to a temperature environment (Step S401). The transceiver 132 receives information on a speed of the fan 120 that corresponds to each temperature environment from the management device 200 (Step S402). The processing unit 133 determines whether the received speed is lower than a speed of the fan 120 that is set corresponding to each temperature environment in the control table 110 (Step S403). When the received speed is lower (YES in Step S403), the processing unit 133 sets the lower speed in the control table 110 as the speed corresponding to the temperature environment (Step S404). When the process of Step S404 is terminated, the information processing device 100 repeats the processes of and after Step S401. When the received speed is higher (NO in Step S403), the information processing device 100 repeats the processes of and after Step S401.

As described with reference to FIGS. 8 and 9, it is possible to acquire a fan speed lower than a fan speed set in the control table 110 as an initial value by acquiring a fan speed that corresponds to a temperature environment from the management device 200. It is possible to reduce power consumption of the information processing device 100 by setting, in the fan 120, a fan speed that corresponds to a temperature environment in the control table 110.

Figure 10:
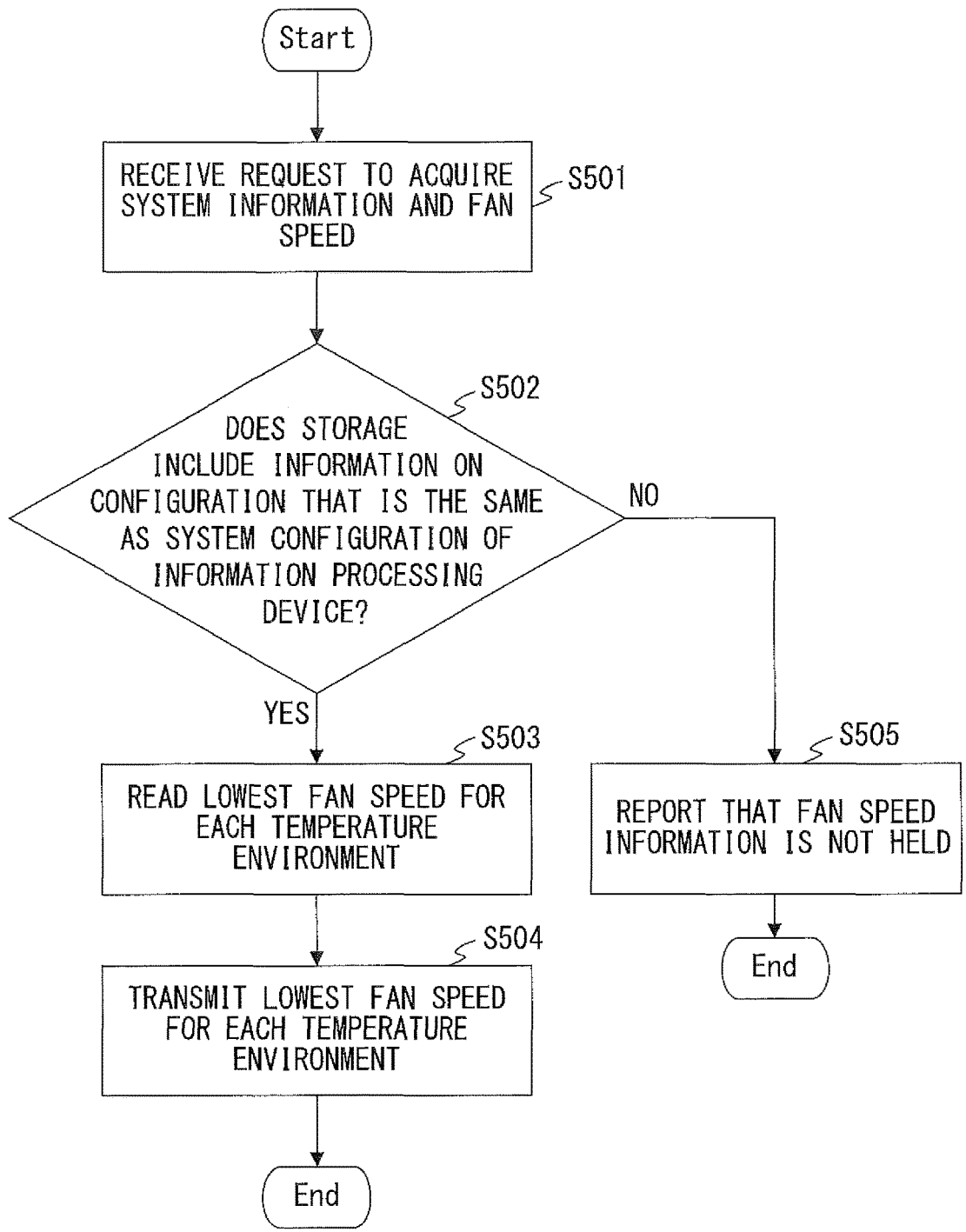
FIG. 10 is a flowchart that illustrates an example of processing performed by the management device (part 2)

FIG. 10 is a flowchart that illustrates an example of processing performed by the management device (part 2). The processing of FIG. 10 is processing performed after the process of Step S302 of FIG. 8 and the process of Step S401 of FIG. 9. The processing performed by the management device (part 2) is the processes of (B2) to (B4) described with reference to FIG. 1. The transceiver 210 receives the system information 150 and a request to acquire a fan speed (Step S501). The controller 220 determines whether the storage 230 includes information on configuration information that is the same as the system information 150 of the side of the information processing device 100 (Step S502). When the storage 230 includes the information on configuration information that is the same as the system information 150 of the side of the information processing device 100 (YES in Step S502), the controller 220 reads a lowest speed of the fan 120 for each temperature environment of the configuration information (Step S503). The transceiver 210 transmits the lowest speed of the fan 120 for each temperature environment of the configuration information to the side of the information processing device 100 (Step S504). When the storage 230 does not include the information on the configuration information that is the same as the system information 150 of the side of the information processing device 100 (NO in Step S502), the controller 220 reports to the side of the information processing device 100 that it does not hold fan speed information (Step S505). When the process of Step S504 or Step S505 is terminated, the controller 220 terminates the processing.

The information processing device 100 can reduce a speed of the fan 120 by receiving a lowest speed of the fan 120 for each temperature environment from the management device 200. It is possible to reduce power consumption of the fan 120 of the information processing device 100.

<Others>

Figure 11:
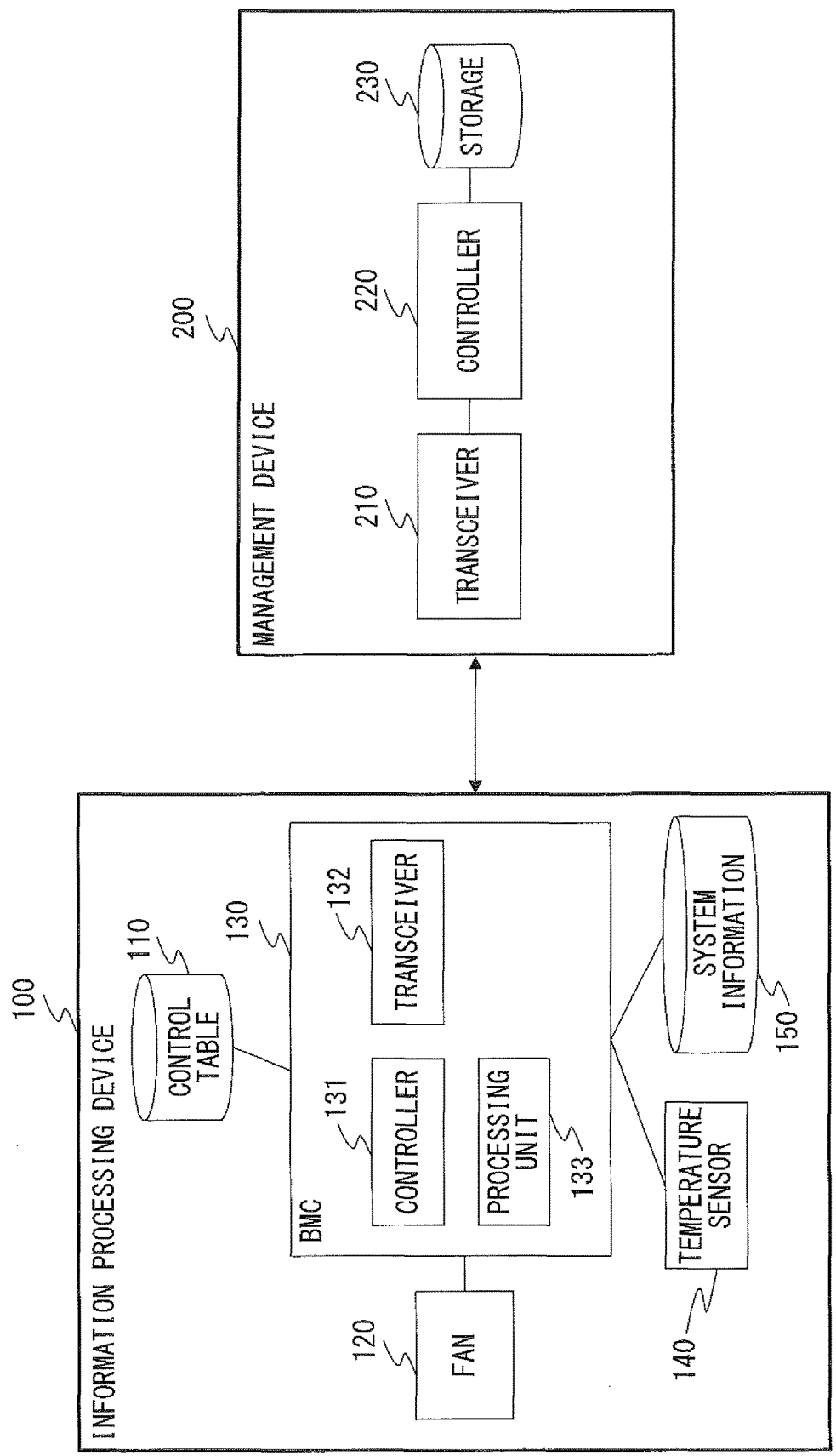
FIG. 11 illustrates an example of the information processing device and the management device according to a second embodiment.

FIG. 11 illustrates an example of the information processing device and the management device according to a second embodiment. For the same components as those in FIG. 1, like reference numbers are used to describe the information processing device and the management device of FIG. 11.

In the second embodiment, processing similar to the processes of (A1) to (A5) is performed on the side of the information processing device 100. Processing performed on the side of the management device 200 after information on the system information 150, temperatures after change, and a speed after change that is transmitted from the information processing device 100 is received (the process of (A6)) is sequentially described below.

(C1) The controller 220 of the management device 200 compares a speed after change with a speed stored in the storage 230 for temperatures after change.

(C1.1) When the speed after change is lower than the speed stored in the storage 230 for temperatures after change, the controller 220 associates the system information 150, the temperatures after change, and the speed after change with one another, and stores them in the storage 230.

(C1.2) When the speed after change is higher than the speed stored in the storage 230 for temperatures after change, the transceiver 210 transmits a speed stored in the storage 230 for each temperature environment to the information processing device 100. Configuration information and one speed for each temperature environment are stored in the storage 230. The controller 220 does not store received information from the information processing device 100 in the storage 230.

(C2) When the process of (C1.2) is terminated, the transceiver 132 of the information processing device 100 receives information on a speed of the fan 120 that corresponds to a temperature environment.

(C3) The processing unit 133 sets, in the control table 110, the temperature environment and the speed corresponding to the temperature environment.

In the process of (B4) described with reference to FIG. 1, the transceiver 210 of the management device 200 transmits, for example, a cooling fan speed that corresponds to each temperature environment of the information processing device 100. In other words, the transceiver 210 of the management device 200 transmits a cooling fan speed that corresponds to each of a plurality of temperature environments.

On the other hand, the transceiver 210 of the management device 200 according to the second embodiment transmits a cooling fan speed that corresponds to a temperature environment measured in the information processing device 100 to the information processing device 100.

As described above, it is possible to make a data amount to be stored in the storage 230 smaller than that in the management device 200 of FIG. 1, by just storing, on the side of the management device 200, a lowest speed for a temperature environment for each type of the information processing device 100.

All examples and conditional language provided herein are intended for the pedagogical purpose of aiding the reader in understanding the invention and the concepts contributed by the inventor to further the art, and are not to be construed as limitations to such specifically recited examples and conditions, nor does the organization of such examples in the specification related to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a processor configured to change, at a predetermined timing, a speed of a cooling fan provided in the information processing device from an initial speed, and to control the cooling fan at a first speed when there is no problem with an operation of the information processing device; and
an interface configured to transmit first information indicating the first speed to a management device, wherein
the processor
receives second information indicating a second speed from the management device that associates the first speed with identification information identifying the information processing device and stores therein the first information indicating the first speed and the identification information, and
updates the initial speed to the second speed when the second speed is lower than the first speed.

2. The information processing device according to claim 1, wherein
the interface transmits information that indicates a type of the information processing device to the management device, and
the processor receives, from the management device, third information indicating a third speed that is a speed of another cooling fan provided in another information processing device whose type is identical to that of the information processing device, and updates the initial speed to the third speed when the third speed is lower than the first speed.

3. The information processing device according to claim 1, further comprising:
a temperature sensor configured to measure temperatures in the information processing device, wherein
the interface receives, from the management device, fourth information indicating a fourth speed of the cooling fan that has a condition consistent with temperature information measured by the temperature sensor when the cooling fan is operating at the first speed, and updates the initial speed to the fourth speed when the fourth speed is lower than the first speed, the fourth speed being included in cooling-fan-speed information in which the first speed is associated with the temperature information and that is stored in the management device.

4. A management device comprising:
a memory configured to store first information indicating a first speed of a cooling fan that is controlled according to a temperature measured by an information processing device, the cooling fan being controlled to change, at a predetermined timing, a speed of the cooling fan from an initial speed;
a reception interface configured to receive second information indicating a second speed of the cooling fan that is used for maintaining an acceptable temperature for an operation of the information processing device; and
a transmission interface configured to store the second information indicating the second speed in the memory when the second speed is lower than the first speed, and to transmit, to the information processing device, the second information indicating the second speed used as a speed of the cooling fan of the information processing device when the second speed is higher than the first speed, the second information being used by the information processing device to update the initial speed to the second speed.

* * * * *